Patented Jan. 2, 1945

2,366,672

UNITED STATES PATENT OFFICE 2,366,672

CHEWING GUM BASE

Gilbert B. Mustin, Lansdowne, Pa., assignor to Frank H. Fleer Corporation, Philadelphia, Pa.

No Drawing. Application November 24, 1942, Serial No. 466,792

7 Claims. (Cl. 99—135)

This invention relates to a chewing gum base and it comprises a chewing gum base material containing a polyvinyl alkyl ether, such as made by polymerizing a vinyl alkyl ether.

Chewing gum is composed of a "base" to which sugar, corn syrup, flavoring materials, food color and the like are added. These chewing gum base materials generally consist of a natural gum or gutta such as chicle, gutta Jelutong, gutta Soh, gutta Siak etc. together with ester gums and rubbery agents such as rubber latex. There are a large number of gummy and resinous materials used in chewing gum as base constituents. Chewing gum should have certain well-defined characteristics, among them being an "elastic" chew, and this property has been generally achieved by the use of rubbery materials. However, almost without exception the rubbery materials hitherto used have been natural products and the physical and chemical properties thereof have necessarily varied. This lack of uniformity has been unavoidable of course, although pains are taken to insure reasonably good uniformity in the rubbery constituent by purification methods, and by the wide selection of materials available. Moreover, these natural materials are often unavailable.

I have now discovered the suitability of a class of rubbery materials which can be made synthetically, and which are particularly well adapted for use as the rubbery constituent, or a portion thereof, in chewing gum bases. The substances I use can be generically defined as polymerized vinyl alkyl ethers, or polyvinyl alkyl ethers, both designations meaning the same thing. These polyvinyl alkyl ethers are known materials and exist in varying states of polymerization, from rather soft plastic masses to relatively tough, though rubbery, solids.

The use of these polyvinyl alkyl ethers in chewing gum base presents many advantages. The ethers can be prepared under careful control to give materials which are uniform from batch to batch. They are free of undesirable odors and taste, are light in color, varying from pale yellow to colorless. They are very gummy and sticky (in the lower polymers) but do not impart stickiness to the final chewing gum. They are freely miscible with the other usual chewing gum ingredients and hence no changes in the method of manufacturing the chewing gum are required.

There are many different polyvinyl alkyl ethers which can be used. I find that the isobutyl ether works very well, but other alkyl ethers can be used. Thus I can use any ether in which one of the alkyl groups is "polyvinyl" and the other is an alkyl radical having carbon atoms as high as eighteen, and possibly higher. Thus I can use the methyl, ethyl, propyl, butyl, isobutyl, hexyl, nonyl, dodecyl, octadecyl etc. derivatives. The isobutyl ether is especially suitable and available and I shall therefore, in the following examples, refer to it specifically, although it is understood that other of the polyvinyl alkyl ethers can be substituted.

One very satisfactory formula contains 35 percent of chicle, 40 percent of an ester gum such as a hydrogenated rosin ester, 15 percent of a filler such as calcium carbonate, and 10 percent of polyvinyl isobutyl ether. These ingredients are blended together in the customary manner. This mixture gives an excellent gum base with better body and more elasticity than can be obtained with chicle alone.

For making so-called "bubble gum" the following mixture is suitable:

| | Percent |
|---|---|
| Gutta Jelutong | 20 |
| Rubber latex (dry solids) | 5 |
| Calcium carbonate | 15 |
| Hydrogenated fat | 15 |
| Polyvinyl isobutyl ether | 20 |
| Paracoumarone resin | 25 |

The above formula gives a highly elastic base for bubble gum, and to it the usual sugar, corn syrup, flavoring materials, and coloring agents can be added.

Still another advantageous mixture consists of 50 percent chicle, 40 percent polyvinyl isobutyl ether, and 10 percent waxy material such as candelilla wax. This mixture gives a very firm product having an elastic chew but which is not at all sticky.

Having thus described my invention, what I claim is:

1. A chewing gum base containing up to 40% of a polyvinyl alkyl ether.
2. A chewing gum base containing up to 40% of a polyvinyl isobutyl ether.
3. A chewing gum base containing chicle, a polyvinyl alkyl ether, and a filler.
4. A chewing gum base containing a polyvinyl isobutyl ether, chicle and a filler.
5. A chewing gum base containing up to 40% of a polymerized vinyl isobutyl ether.
6. A chewing gum base containing Jelutong, chicle, filler and polyvinyl isobutyl ether.
7. A chewing gum base containing a polyvinyl alkyl ether and a natural gum.

GILBERT B. MUSTIN.